United States Patent
Hubbard

(10) Patent No.: US 7,759,455 B2
(45) Date of Patent: Jul. 20, 2010

(54) PROCESS FOR PREPARING A POLYMER POWDER EXTRACT

(75) Inventor: Neil Hubbard, Halifax (GB)

(73) Assignee: Orthoplastics Ltd., Lancashire (GB)

( * ) Notice: Subject to any disclaimer, the term of this patent is extended or adjusted under 35 U.S.C. 154(b) by 0 days.

(21) Appl. No.: 12/267,282

(22) Filed: Nov. 7, 2008

(65) Prior Publication Data

US 2010/0004420 A1    Jan. 7, 2010

(30) Foreign Application Priority Data

Jul. 4, 2008    (GB) ................... 0812284.8

(51) Int. Cl.
*C08F 6/00* (2006.01)
*C08G 63/02* (2006.01)

(52) U.S. Cl. .............. 528/480; 428/402; 428/404; 528/483; 528/502 R

(58) Field of Classification Search ........... 428/402, 428/404; 528/480, 483, 502 R
See application file for complete search history.

(56) References Cited

U.S. PATENT DOCUMENTS

| 4,163,837 | A | 8/1979 | Rush |
| 5,034,132 | A | 7/1991 | Miyakawa et al. |
| 5,344,493 | A | 9/1994 | Jackson |
| 6,071,439 | A | 6/2000 | Bawa et al. |
| 6,529,313 | B1* | 3/2003 | Lin et al. .................. 359/296 |
| 7,108,001 | B2 | 9/2006 | Pope et al. |
| 7,470,767 | B2 | 12/2008 | Deorkar et al. |
| 2003/0125513 | A1 | 7/2003 | King |
| 2006/0219276 | A1 | 10/2006 | Bohnert et al. |

FOREIGN PATENT DOCUMENTS

| WO | 98/51347 | 11/1998 |
| WO | 2007/096424 | 8/2007 |

OTHER PUBLICATIONS

EP patent application 08253612, Search Report mailed Jan. 26, 2010.

* cited by examiner

*Primary Examiner*—Terressa M Boykin
(74) *Attorney, Agent, or Firm*—Weaver Austin Villeneuve & Sampson LLP

(57) ABSTRACT

A process for preparing a polymer powder extract from a mixture of a polymer powder and a first particulate material reduces the level of particulate contamination of the polymer powder by exploiting the different behaviour of the particulate material and the polymer powder in a fluid.

14 Claims, 1 Drawing Sheet

PROCESS FOR PREPARING A POLYMER POWDER EXTRACT

The present invention relates to a process for preparing a polymer powder extract from a mixture of a polymer powder and a first particulate material.

A polymer powder often contains undesirable particulate contaminants generated during manufacture or introduced inadvertently. The particulate contaminants may spoil the aesthetic appearance of the article made from the polymer powder and may affect detrimentally its function. A simple separation technique such as sieving generally fails to remove particulate contaminants from polymer powder due to the commonality of particle sizes.

Figure 1:
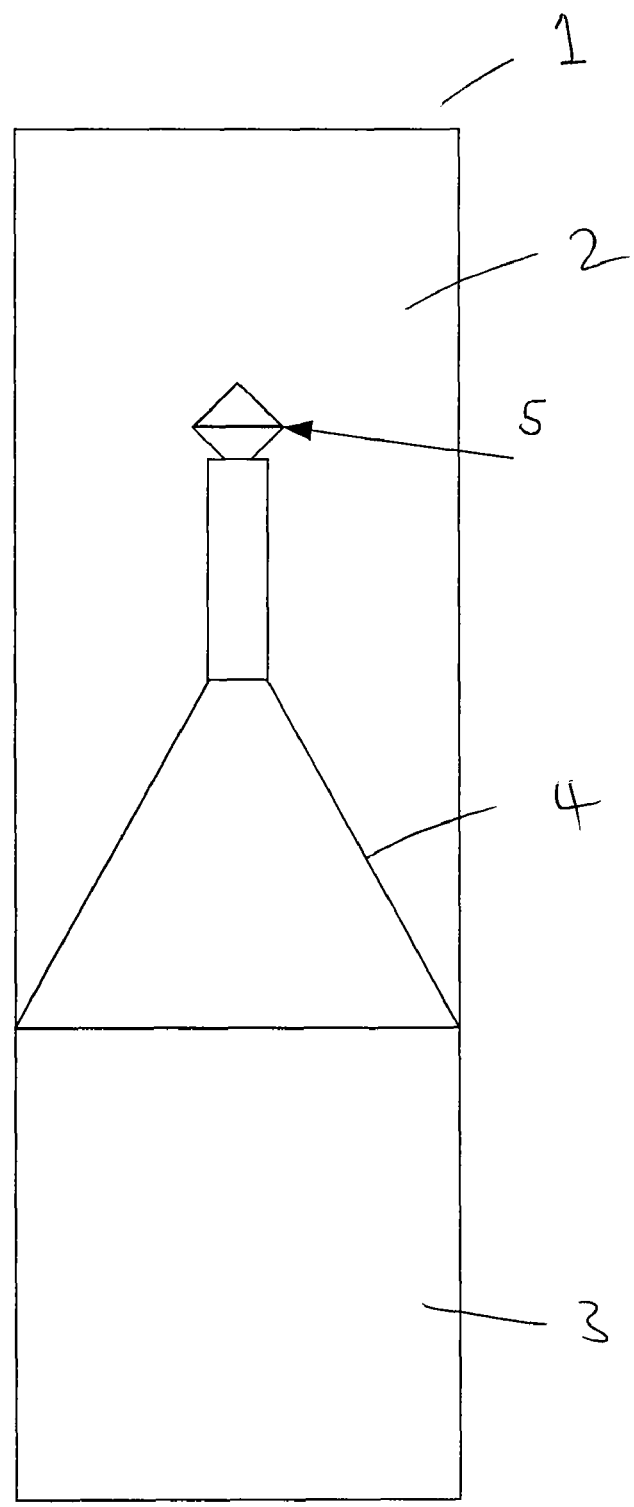
FIG. 1 is an illustration of a processing vessel in which the process described in Example 1 was conducted in accordance with the present invention.

The present invention seeks to reduce the level of particulate contamination of a polymer powder by exploiting the different behaviour of the particulate material and the polymer powder in a fluid.

Thus viewed from a first aspect the present invention provides a process for preparing a polymer powder extract from a mixture of a polymer powder and a first particulate material, the process comprising:

(a) suspending the mixture in a fluid to form a fluid suspension;

(b) adjusting the density of the fluid so that either the first particulate material has a specific gravity relative to the fluid of more than 1 and the polymer powder has a specific gravity relative to the fluid of less than 1 or the first particulate material has a specific gravity relative to the fluid of less than 1 and the polymer powder has a specific gravity relative to the fluid of more than 1 whereby to cause the fluid suspension to form a first fraction which contains an amount of the first particulate material and a second fraction which contains substantially the whole of the polymer powder, (c) separating the first fraction from the second fraction; and (d) removing the fluid from the second fraction to obtain the polymer powder extract.

The process of the invention advantageously prepares a polymer powder extract with a significant increase in polymer purity compared with the mixture.

Typically the density of the fluid is 1.1 g/cm$^3$ or less. Preferably the density of the fluid is adjustable throughout the range 0.90 to 1.0 g/cm$^3$.

The average particle size of the first particulate material is typically substantially the same as the average particle size of the polymer powder.

The first fraction may contain substantially the whole of the first particulate material.

Preferably step (b) is preceded by:

(a1) allowing the fluid suspension to form a minor fraction which contains an amount of a particulate material and a major fraction which contains substantially the whole of the polymer powder;

(a2) separating the minor fraction from the major fraction.

Step (a1) may be carried out in a period in excess of 10 minutes (eg 15-30 minutes). By allowing the formation of a major fraction containing less particulate material in step (a1), step (b) advantageously causes the major fraction to form a second fraction with a further improvement in the level of polymer purity.

The average density of the polymer powder may be 1.1 g/cm$^3$ or less, preferably in the range 0.5 to 1.0 g/cm$^3$, particularly preferably in the range 0.85 to 1.0 g/cm$^3$, more preferably 0.92 to 0.96 g/cm$^3$.

In a first preferred embodiment, in step (b) the polymer powder has a specific gravity relative to the fluid of less than 1 and the first particulate material has a specific gravity relative to the fluid of more than 1.

Particularly preferably in step (b) the first particulate material has a specific gravity relative to the fluid of 1.1 or more, particularly preferably 1.3 or more, more preferably 1.5 or more, most preferably 2.0 or more.

Particularly preferably in step (b) the polymer powder has a specific gravity relative to the fluid of 0.99 or less, particularly preferably 0.97 or less, more preferably 0.95 or less, most preferably 0.93 or less.

In a second embodiment, in step (b) the first particulate material has a specific gravity relative to the fluid of less than 1 and the polymer powder has a specific gravity relative to the fluid of more than 1.

For example, in step (b) the polymer powder has a specific gravity relative to the fluid of 1.1 or more, preferably 1.3 or more, particularly preferably 1.5 or more, more preferably 2.0 or more.

For example, in step (b) the first particulate material has a specific gravity relative to the fluid of 0.99 or less, preferably 0.97 or less, particularly preferably 0.95 or less, more preferably 0.93 or less.

Preferably in step (a) the polymer powder has a specific gravity relative to the fluid of about 1.

In step (b), the density of the fluid may be adjusted (eg raised) by adjusting the pressure or temperature of the fluid. Preferably the density of the fluid is adjusted (eg raised) by adjusting (eg increasing) the pressure of the fluid (eg at a static temperature).

The mixture of the polymer powder and the first particulate material may further comprise one or more additional particulate materials.

The density of the first particulate material and the (or each) additional particulate material is typically different. The average particle size of the (or each) additional particulate material is typically substantially the same as the average particle size of the polymer powder.

The first fraction may contain an amount (eg substantially the whole) of the (or each) additional particulate material.

Preferably in step (b) the (or each) additional particulate material has a specific gravity relative to the fluid of more than 1, preferably 1.1 or more, particularly preferably 1.3 or more, more preferably 1.5 or more, most preferably 2.0 or more.

The density of the first (and the or each additional) particulate material is typically more than 1 g/cm$^3$, preferably 2 g/cm$^3$ or more, particularly preferably 5 g/cm$^3$ or more.

The fluid may be a liquid or a supercritical fluid. The fluid may be formed in situ with the mixture in step (a) in a suitable vessel or delivered (eg pumped) to the mixture in the vessel.

Preferably the fluid is a supercritical fluid. The temperature and pressure of a supercritical fluid may be readily adjusted to achieve a desired density within a large range. This makes a supercritical fluid a versatile choice of fluid with which to ensure in step (b) that either the first particulate material has a specific gravity relative to the fluid of more than 1 and the polymer powder has a specific gravity relative to the fluid of less than 1 or the first particulate material has a specific gravity relative to the fluid of less than 1 and the polymer powder has a specific gravity relative to the fluid of more than 1.

The supercritical fluid may be an alkane, alkene, alcohol, ketone or carbon dioxide.

In a preferred embodiment, the fluid is supercritical carbon dioxide.

The temperature and pressure of supercritical carbon dioxide may be readily adjusted to achieve a desired density within a large range. Furthermore supercritical carbon dioxide may be removed advantageously in step (d) substantially without residue.

The temperature of the supercritical carbon dioxide in the process of the invention is typically in excess of 31° C., preferably in the range of 40° to 100° C. (eg at about 40° C.).

The pressure of the supercritical carbon dioxide in step (a) and (b) is typically in excess of 74 Bar, preferably in excess of 100 Bar, more preferably in excess of 200 Bar, particularly preferably in the range 250 to 800 Bar, most preferably in the range 330 to 500 Bar.

Preferably the pressure of the supercritical carbon dioxide in step (a) is in the range 300 to 360 Bar.

Preferably the pressure of the supercritical carbon dioxide in step (b) is in the range 475 to 525 Bar.

Preferably the density of supercritical carbon dioxide is 1 $g/cm^3$ or less (eg in the range 0.90 to 1 $g/cm^3$).

Step (b) may cause the fluid suspension to form gravitationally a first fraction which contains an amount of the first particulate material and a second fraction which contains substantially the whole of the polymer powder.

The first fraction and second fraction may be caused to form gravitationally without physical intervention. Alternatively the first fraction and second fraction may be caused to form gravitationally with physical intervention. The physical intervention may be mechanical intervention. The physical intervention may be electrical, vibrational, centrifugal or cyclonic.

Preferably in the second fraction the polymer powder is buoyant.

Preferably the polymer powder is substantially insoluble in the fluid.

Preferably the first (and the or each additional) particulate material is substantially insoluble in the fluid.

The first (and the or each additional) particulate material may be debris (eg debris from fabrication of the polymer). The first (and the or each additional) particulate material is typically non-polymeric. The first (and the or each additional) particulate material may be a metal or non-metal or a metallic or non-metallic compound.

Specific examples of the first (and the or each additional) particulate material are silicates, calcium compounds and glasses.

In a preferred embodiment, the polymer powder is a synthetic polymer powder. Preferably the synthetic polymer powder is medical-grade (ie suitable for and intended for medical use).

Preferably the polymer powder is a polyolefin, particularly preferably polyethylene, more preferably an ultra-high molecular weight polyethylene (UHMWPE), most preferably an ultra-high molecular weight polyethylene with a molecular weight in excess of $1\times10^6$ g/mol.

Step (d) may be carried out by any convenient method. For example, step (d) may be carried out by drying (eg by heating or vacuum pumping).

The polymer powder extract from step (d) may constitute a mixture of a polymer powder and one or more particulate materials which may be recycled one or more times through steps (a) to (d).

Step (c) may be carried out by decanting.

The present invention will now be described in a non-limitative sense with reference to the following Example and FIG. 1 in which there is illustrated a processing vessel.

EXAMPLE

The process of the invention was carried out in a processing vessel 1 illustrated in FIG. 1. The processing vessel 1 comprises an upper chamber 2 and a lower chamber 3 separated by a conical chimney 4 which terminates in a passive non-return valve 5.

Contaminated UHMWPE powder was placed into the lower chamber 3 of the processing vessel 1. The processing vessel 1 was placed in a pressure chamber. Supercritical carbon dioxide was pumped into the processing vessel 1 and at a temperature of 40° C., the pressure was adjusted incrementally from 330 Bar to 500 Bar to adjust the density of the carbon dioxide. Initially at a density maintained in the range 0.92 to 0.93 $g/cm^3$ for 15-30 minutes, the UHMWPE powder formed a suspension. As the pressure of carbon dioxide was increased to achieve a density maintained in the range 0.97 to 0.99 $g/cm^3$, the UHMWPE polymer floated into the upper chamber 2 via the passive non-return valve 5. The contaminants settled out by gravity in the lower chamber 3 in the lower chamber 3 where it was collected on a filter paper and ejected. The upper chamber 2 of the processing vessel 1 was vented to a recovery plant to leave behind a purified polymer powder extract.

The invention claimed is:

1. A process for preparing a polymer powder extract from a mixture of a polymer powder and a first particulate material, the process comprising:
   (a) suspending the mixture in a fluid, the fluid having a density adjustable throughout the range 0.90 to 1.0 $g/cm^3$, to form a fluid suspension;
   (b) adjusting the density of the fluid so that either the first particulate material has a specific gravity relative to the fluid of more than 1 and the polymer powder has a specific gravity relative to the fluid of less than 1 or the first particulate material has a specific gravity relative to the fluid of less than 1 and the polymer powder has a specific gravity relative to the fluid of more than 1 whereby to cause the fluid suspension to form a first fraction which contains an amount of the first particulate material and a second fraction which contains substantially the whole of the polymer powder,
   (c) separating the first fraction from the second fraction; and
   (d) removing the fluid from the second fraction to obtain the polymer powder extract.

2. A process as claimed in claim 1 wherein step (b) is preceded by:
   (a1) allowing the fluid suspension to form a minor fraction which contains an amount of a particulate material and a major fraction which contains substantially the whole of the polymer powder; and
   (a2) separating the minor fraction from the major fraction.

3. A process as claimed in claim 1 wherein in step (b) the polymer powder has a specific gravity relative to the fluid of less than 1 and the first particulate material has a specific gravity relative to the fluid of more than 1.

4. A process as claimed in claim 3 wherein in step (b) the polymer powder has a specific gravity relative to the fluid of 0.95 or less.

5. A process as claimed in claim 1 wherein in step (b), the density of the fluid is adjusted by adjusting the pressure of the fluid.

6. A process as claimed in claim 1 wherein the fluid is a supercritical fluid.

7. A process as claimed in claim 6 wherein the fluid is supercritical carbon dioxide.

8. A process as claimed in claim 7 wherein the pressure of the supercritical carbon dioxide in steps (a) and (b) is in the range 250 to 800 Bar.

9. A process as claimed in claim 7 wherein the pressure of the supercritical carbon dioxide in step (b) is in the range 475 to 525 Bar.

10. A process as claimed in claim 1 wherein in the second fraction the polymer powder is buoyant.

11. A process as claimed in claim 1 wherein the average density of the polymer powder is in the range 0.5 to 1.0 g/cm$^3$.

12. A process as claimed in claim 1 wherein the mixture of a polymer powder and a first particulate material further comprises one or more additional particulate materials.

13. A process as claimed in claim 1 wherein the polymer powder is medical-grade.

14. A process as claimed in claim 1 wherein the polymer powder is an ultra-high molecular weight polyethylene.

* * * * *